Nov. 24, 1931.  F. P. GIUFFRÉ  1,833,458
HAND LEVER MECHANISM FOR OPERATING AUTOMOBILE CLUTCH AND BRAKE PEDALS
Filed Sept. 15, 1930
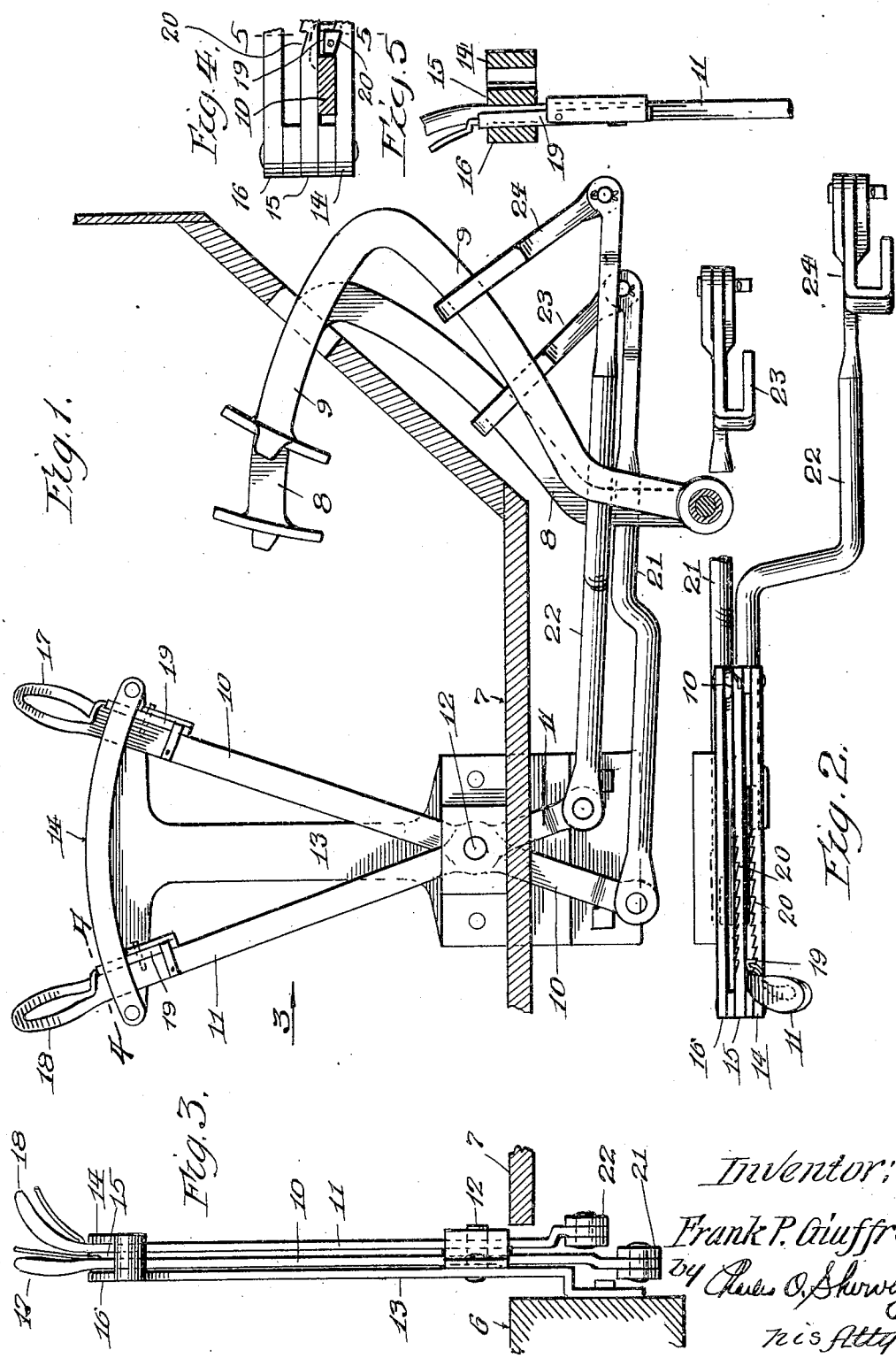

Patented Nov. 24, 1931

1,833,458

UNITED STATES PATENT OFFICE

FRANK P. GIUFFRÈ, OF CHICAGO, ILLINOIS

HAND LEVER MECHANISM FOR OPERATING AUTOMOBILE CLUTCH AND BRAKE PEDALS

Application filed September 15, 1930. Serial No. 481,860.

This invention relates to hand lever mechanism for operating automobile clutch and brake pedals, and its principal object is to provide novel mechanism for enabling persons, who are unable to depress the usual clutch and brake pedals with their feet, to drive automobiles.

Another object is to provide hand manipulated lever mechanism disposed adjacent each other and operatively connected with the clutch and brake pedals, whereby one may depress either or both of said pedals by one hand while controlling the steering wheel with the other hand. Another object is to provide hand manipulated mechanism for operating the clutch and brake pedals so arranged that said pedals may be operated with the feet, if so desired.

The invention consists, therefore, in adjacently located hand manipulated clutch and brake pedal actuating mechanisms having operative connections between the hand operated levers and the clutch and brake pedals. It further consists in hand manipulated mechanism for depressing clutch and brake pedals provided with connections to said brake pedal so arranged that the pedals may be depressed with the feet independently of the hand manipulated mechanism.

The invention further consists in the several novel features hereinafter fully set forth and claimed.

The invention is clearly illustrated in the drawings accompanying this specification in which—

Figure 1 is a side elevation of hand lever mechanism for operating automobile clutch and brake mechanism embodying a single form of the present invention and showing the same applied to the clutch and brake pedals of an automobile;

Fig. 2 is a plan, partly broken out, of the mechanism with the clutch and brake pedals omitted from the view;

Fig. 3 is an end elevation of the mechanism looking in the direction of the arrow 3 in Fig. 1;

Fig. 4 is a detail cross section taken on the line 4—4 of Fig. 1; and

Fig. 5 is a detail vertical cross section taken on the line 5—5 of Fig. 4.

Referring to said drawings, the reference character 6 designates a fragment of the chassis or supporting frame of an automobile, and 7 the floor boards thereof. The usual clutch pedal is seen at 8 and the brake pedal at 9. As is well understood, the clutch pedal is employed to disengage members of the clutch mechanism when it is desired to shift the transmission gears, and the brake pedal is employed to actuate the brakes when it is desired to stop or slacken the speed of the automobile. Ordinarily, the clutch and brake pedals are actuated by the feet of the person driving the automobile, which makes it impossible for one who has not the use of his lower limbs to drive an automobile.

The mechanism for depressing the clutch and brake pedals by hand comprises, among other things, hand levers 10 and 11 for operating the clutch and brake pedals, and said hand levers are usually located adjacent each other at the left side of the person driving the automobile in convenient position to be grasped with the left hand while the right hand is free to control the steering wheel. The hand levers 10 and 11 are fulcrumed upon a stud or pin 12 mounted on a standard 13, which is bolted or otherwise secured to the chassis or other framework 6 of the automobile at a point somewhat forward of and at the left of the driver's seat.

On the upper end of the standard 13 are spaced segmental bars 14, 15 and 16 which provide slots therebetween through which the upper ends of the hand levers 10 and 11 project. The levers are provided with handles 17 and 18 on their upper ends and are also provided with spring pressed pawls 19 which engage with ratchet teeth 20 formed on the segmental bars 14 and 15. The drawings illustrate the hand lever 10 in its normal or inactive position and the hand lever 11 in its operative position depressing the brake pedal.

To the lower arms of the hand levers 10 and 11 are pivotally connected push rods, operating struts, or the like, 21 and 22, which extend forward under the floor boards 7 of the automobile and have straps or other pedal engaging members 23 and 24 pivotally connected to their forward ends. The push rods 21 and 22 may be bent up into desired shapes to pass by parts which would otherwise interfere with their operation, and also to bring the pedal engaging members 23 and 24 into alignment with the clutch and brake pedals 8 and 9.

The pedal engaging members are preferably in the form of open loops or hooks which pass around the arms of the clutch and brake pedals and act to depress said pedals when moved forward by the hand levers, but, by reason of the open loop or hook construction, the clutch and brake pedals may be depressed by the feet of the driver of the automobile without affecting the hand manipulated mechanism. This lost motion connection between the pedal operating members and the clutch and brake pedals is of importance, since it permits one to operate the clutch and brake pedals with the feet.

In operation, and under normal conditions, the hand levers 10 and 11 occupy the forward position, such as is occupied by the hand lever 10, and the clutch and brake pedals are in their raised positions. When it is desired to shift gears, the person driving the automobile draws back the hand lever 10, thereby depressing the clutch pedal 8 through the instrumentality of the push rod 21 and pedal operating member 23. The pawl 19 of the hand lever 10 engages with a ratchet tooth 20 and holds the hand lever in its rear position with the clutch pedal depressed. With the clutch pedal thus depressed, the driver shifts the gears with the gear shift lever of the automobile and then releases the clutch pedal by disengaging the pawl from the ratchet tooth permitting the clutch lever to return to its normal position and therewith moving the hand lever 10 to its forward position.

Wishing to apply the brake, the driver draws the hand lever 11 back to the position shown in Fig. 1, thereby depressing the brake pedal 9 through the instrumentality of the push rod 22 and pedal engaging member 24. The parts are held in this position by the pawl 19 of the hand lever 11 and the tooth 20 of the toothed segmental bar with which the pawl engages. When it is desired to release the brakes, the driver disengages the pawl from the ratchet tooth permitting the brake pedal to return to its normal position and therewith move the hand lever 11 to its forward position. It is well understood that spring return mechanism is provided for the clutch and brake pedals, as is customary in automobile construction, and that when both or either hand lever is disengaged from the toothed segmental bar, the action of the spring on a pedal will operate to return the pedal to normal position and therewith move the associated hand lever to its forward position.

When it is desired to release the clutch and simultaneously set the brakes, the driver takes hold of both hand levers 10 and 11 and draws them towards him, thereby simultaneously depressing both the clutch and brake pedals. This is usually done when bringing the automobile to a stop, or sometimes when slacking its speed.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In automobile clutch and brake pedal operating mechanism, the combination of two adjacently located hand levers having adjacent handles whereby they may be actuated separately and in unison, said hand levers having arms extending below the floor boards of an automobile, push rods below the floor boards and one pivotally connected to said arm of one lever and the other pivotally connected to said arm of the other lever, and open loops pivotally connected to the other ends of the push rods and engaging one over a clutch pedal and the other over a brake pedal.

2. In automobile clutch and brake pedal operating mechanism, the combination of two adjacently located hand levers having adjacent handles whereby they may be actuated separately and in unison and having also pawl and ratchet mechanism for holding the hand levers in adjusted position, said hand levers having arms extending below the floor boards of an automobile, push rods below the floor boards, one pivotally connected to said arm of one lever and the other pivotally connected to said arm of the other lever, and open loops pivotally connected to the other ends of the push rods and engaging one over a clutch pedal and the other over a brake pedal.

FRANK P. GIUFFRÈ.